United States Patent
Yang et al.

(10) Patent No.: US 11,557,792 B2
(45) Date of Patent: Jan. 17, 2023

(54) ELECTROLYTE FOR LITHIUM SECONDARY BATTERY AND LITHIUM-SECONDARY BATTERY INCLUDING THE SAME

(71) Applicant: LG CHEM, LTD., Seoul (KR)

(72) Inventors: Seung Yoon Yang, Daejeon (KR); Dongwook Koh, Daejeon (KR); Doo Kyung Yang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 316 days.

(21) Appl. No.: 16/644,766

(22) PCT Filed: Sep. 21, 2018

(86) PCT No.: PCT/KR2018/011205
§ 371 (c)(1),
(2) Date: Mar. 5, 2020

(87) PCT Pub. No.: WO2019/059698
PCT Pub. Date: Mar. 28, 2019

(65) Prior Publication Data
US 2021/0075062 A1    Mar. 11, 2021

(30) Foreign Application Priority Data

Sep. 21, 2017 (KR) .................. 10-2017-0121599
Sep. 20, 2018 (KR) .................. 10-2018-0112635

(51) Int. Cl.
*H01M 4/38* (2006.01)
*H01M 4/58* (2010.01)
(Continued)

(52) U.S. Cl.
CPC ....... *H01M 10/0567* (2013.01); *H01M 4/382* (2013.01); *H01M 4/405* (2013.01);
(Continued)

(58) Field of Classification Search
CPC ............ H01M 4/58; H01M 4/38; H01M 4/40; H01M 10/0567; H01M 10/052; H01M 10/0569
See application file for complete search history.

(56) References Cited

U.S. PATENT DOCUMENTS 9,257,719 B1    2/2016 Liu et al.
2003/0124432 A1* 7/2003 Miura ............... H01M 10/052
429/316

(Continued)

FOREIGN PATENT DOCUMENTS

CN    103682437 A    3/2014
CN    104756302 A    7/2015
(Continued)

OTHER PUBLICATIONS

Extended European Search Report for European Application No. 18859693.6, dated Sep. 18, 2020.
(Continued)

*Primary Examiner* — Kenneth J Douyette
(74) *Attorney, Agent, or Firm* — Birch, Stewart, Kolasch & Birch, LLP

(57) ABSTRACT

An electrolyte for a lithium-secondary battery including a solvent, a lithium salt and an additive, wherein the additive includes a diamine-based compound, and a lithium-secondary battery including the same.

20 Claims, 5 Drawing Sheets

(51) Int. Cl.
  *H01M 4/40* (2006.01)
  *H01M 10/0567* (2010.01)
  *H01M 10/052* (2010.01)
  *H01M 10/0568* (2010.01)
  *H01M 10/0569* (2010.01)

(52) U.S. Cl.
  CPC ....... *H01M 4/5815* (2013.01); *H01M 10/052* (2013.01); *H01M 10/0568* (2013.01); *H01M 10/0569* (2013.01); *H01M 2300/0025* (2013.01)

(56) References Cited

U.S. PATENT DOCUMENTS

| | | |
|---|---|---|
| 2012/0276459 A1 | 11/2012 | Im et al. |
| 2013/0330591 A1* | 12/2013 | Saito ................... H01M 50/414 429/246 |
| 2015/0044574 A1* | 2/2015 | Cakmak .............. H01M 50/426 29/623.5 |
| 2015/0288032 A1 | 10/2015 | Choi et al. |
| 2017/0117584 A1 | 4/2017 | Qian et al. |
| 2018/0316068 A1 | 11/2018 | Park et al. |

FOREIGN PATENT DOCUMENTS

| | | |
|---|---|---|
| CN | 105244539 A | 1/2016 |
| CN | 106711506 A | 5/2017 |
| JP | 2005-243490 A | 9/2005 |
| JP | 2005-251556 A | 9/2005 |
| JP | 2011-49109 A | 3/2011 |
| JP | 2011-49111 A | 3/2011 |
| KR | 10-2012-0122674 A | 11/2012 |
| KR | 10-2015-0050149 A | 5/2015 |
| KR | 10-2017-0103630 A | 9/2017 |
| WO | WO 2017-150801 A1 * | 9/2017 |

OTHER PUBLICATIONS

International Search Report (PCT/ISA/210) issued in PCT/KR2018/011205, dated Apr. 9, 2019.

* cited by examiner

【Figure 1】
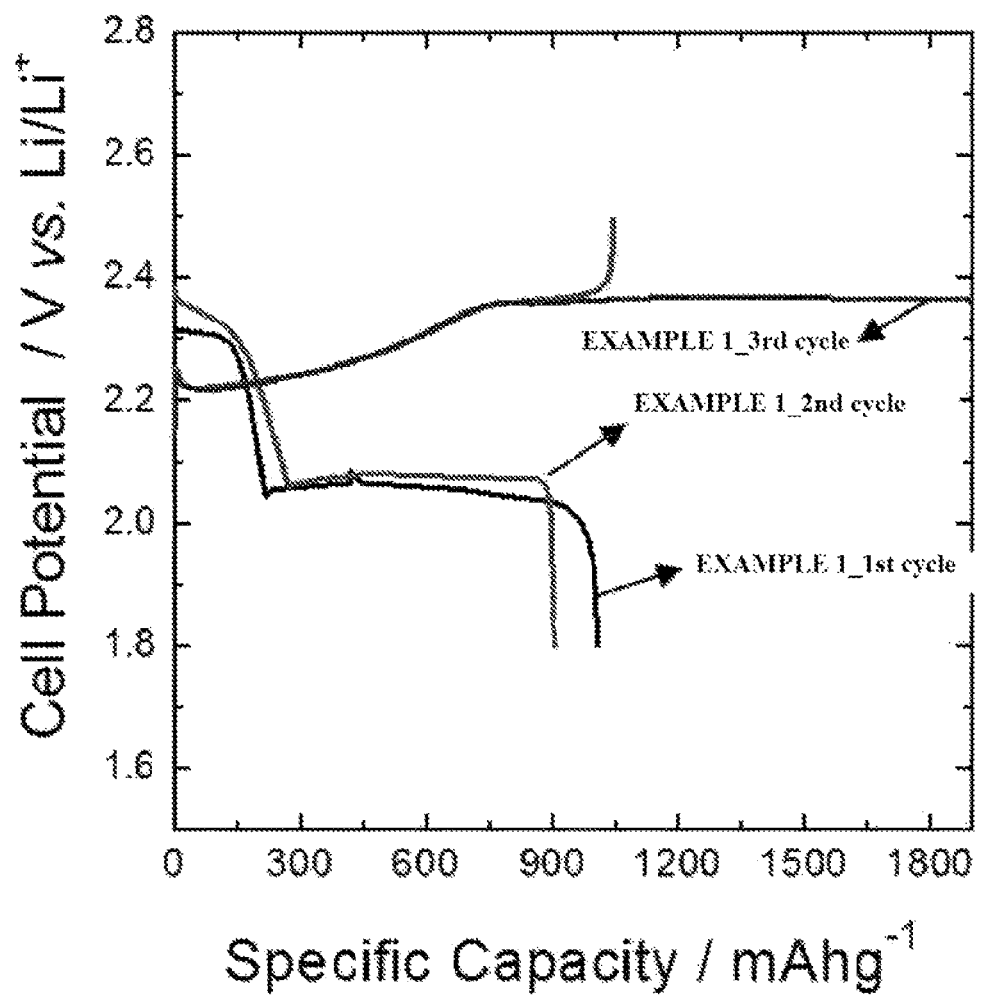

[Figure 2]
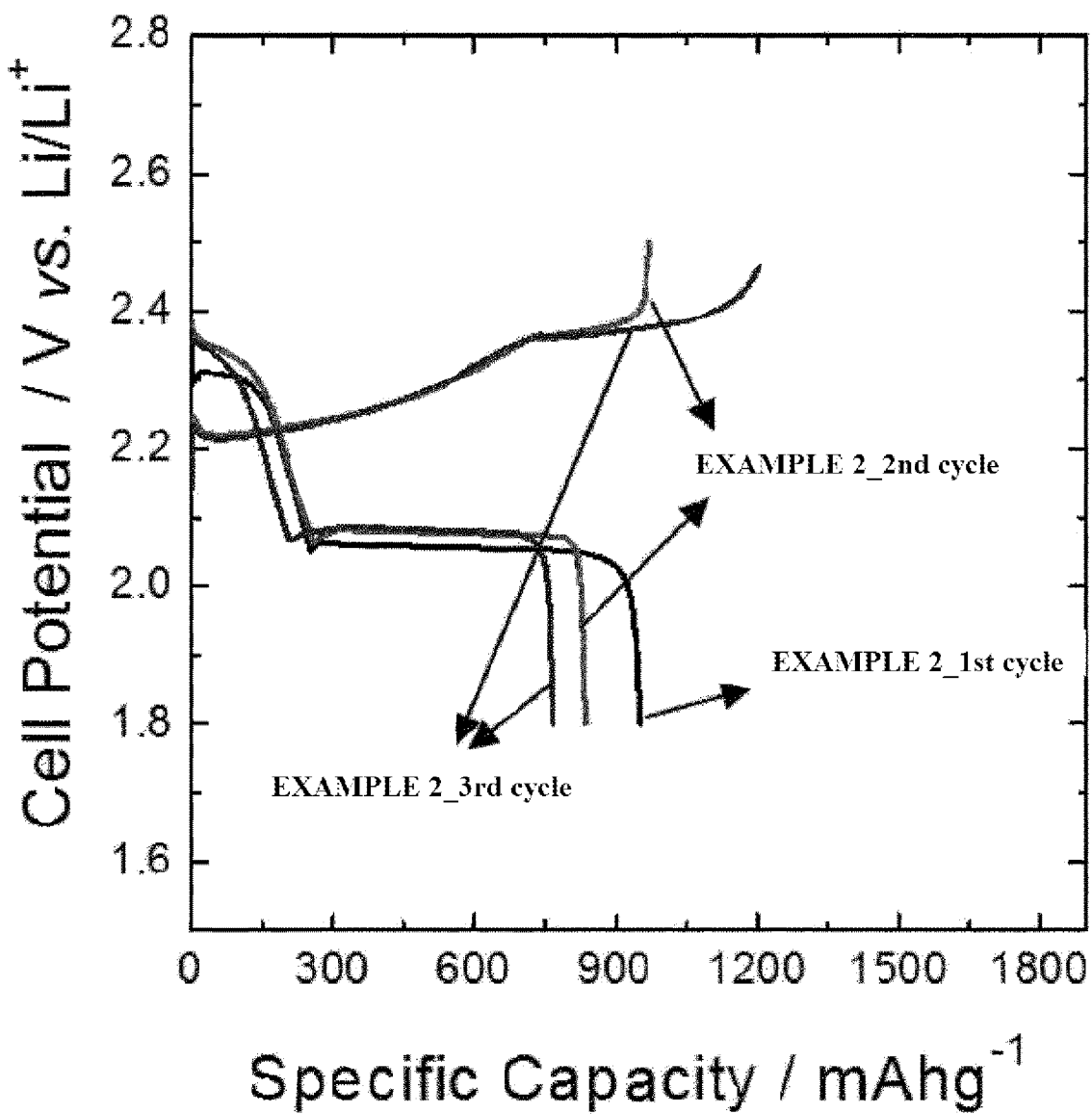

[Figure 3]
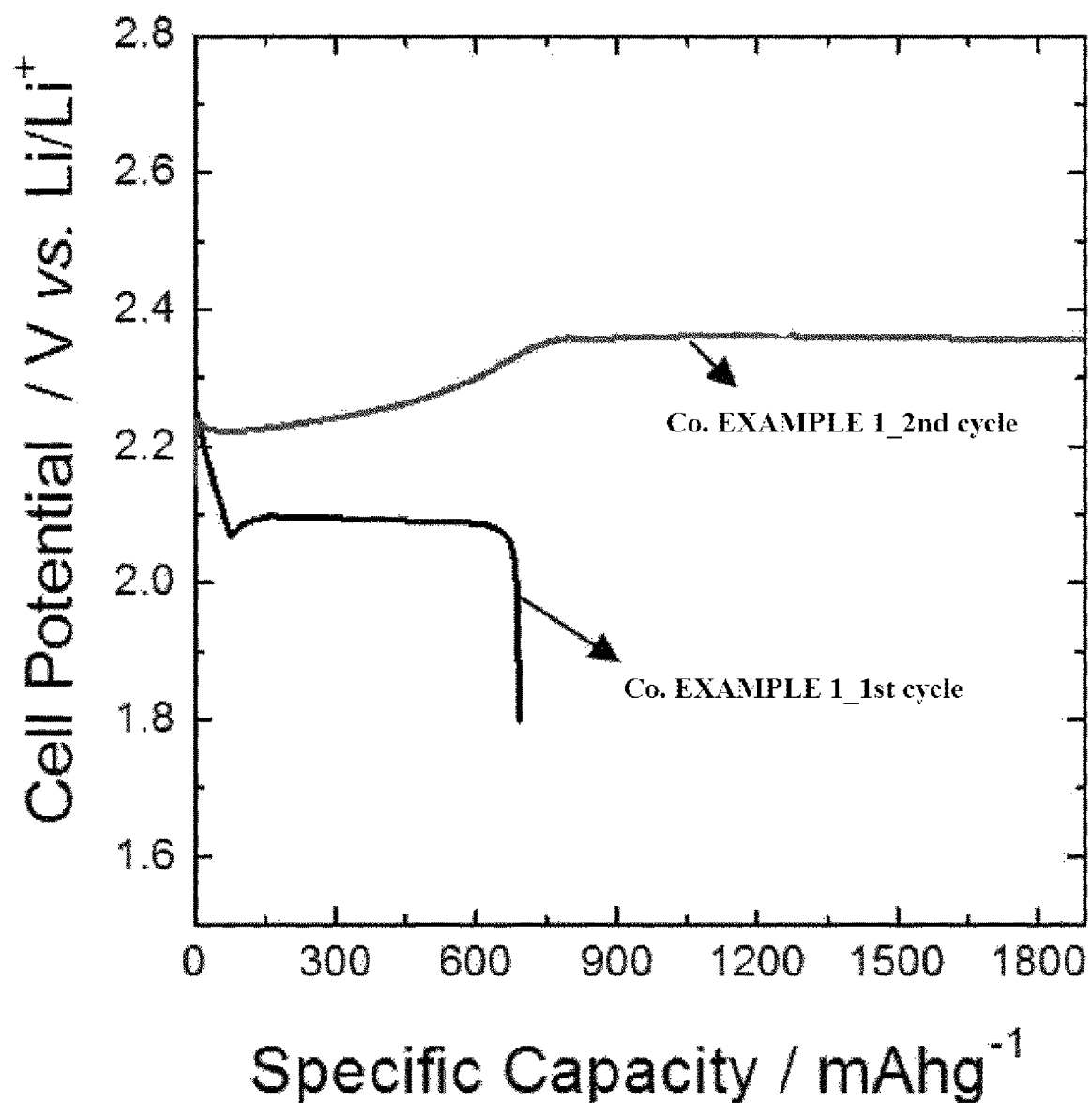

[Figure 4]
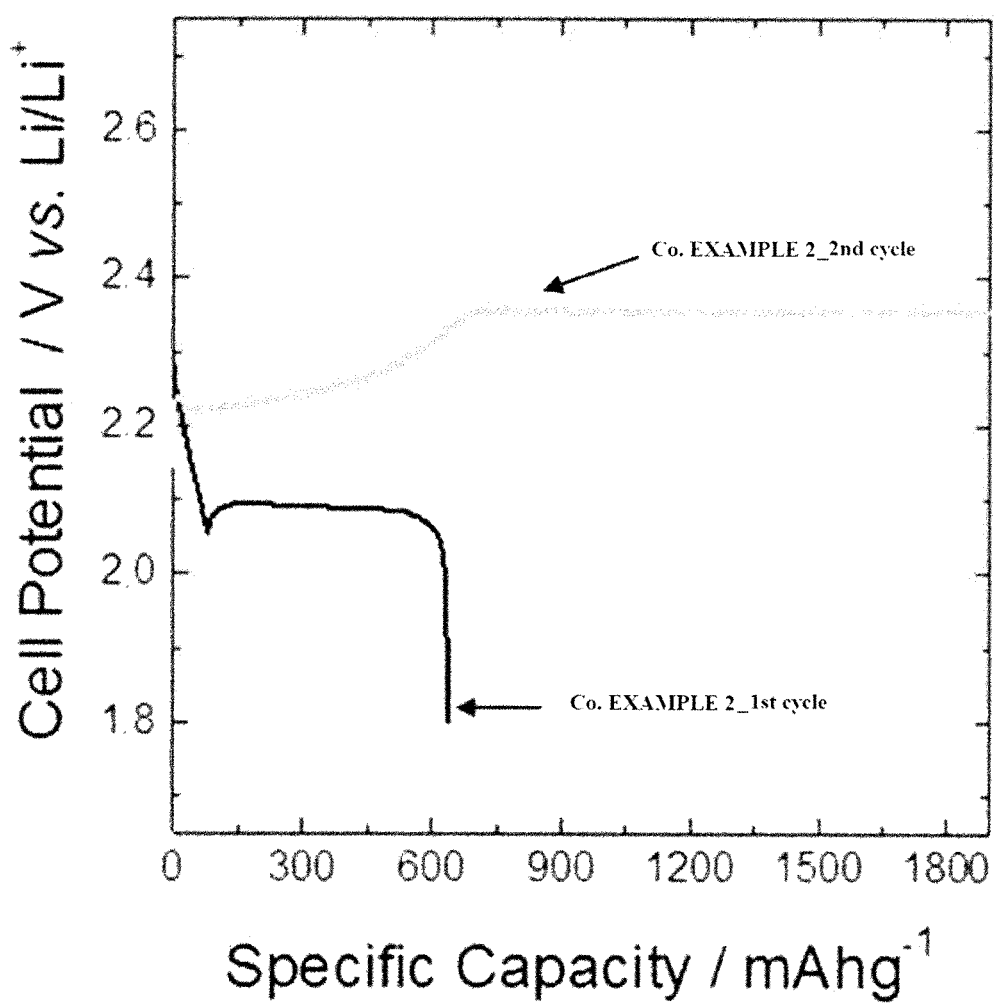

[Figure 5]
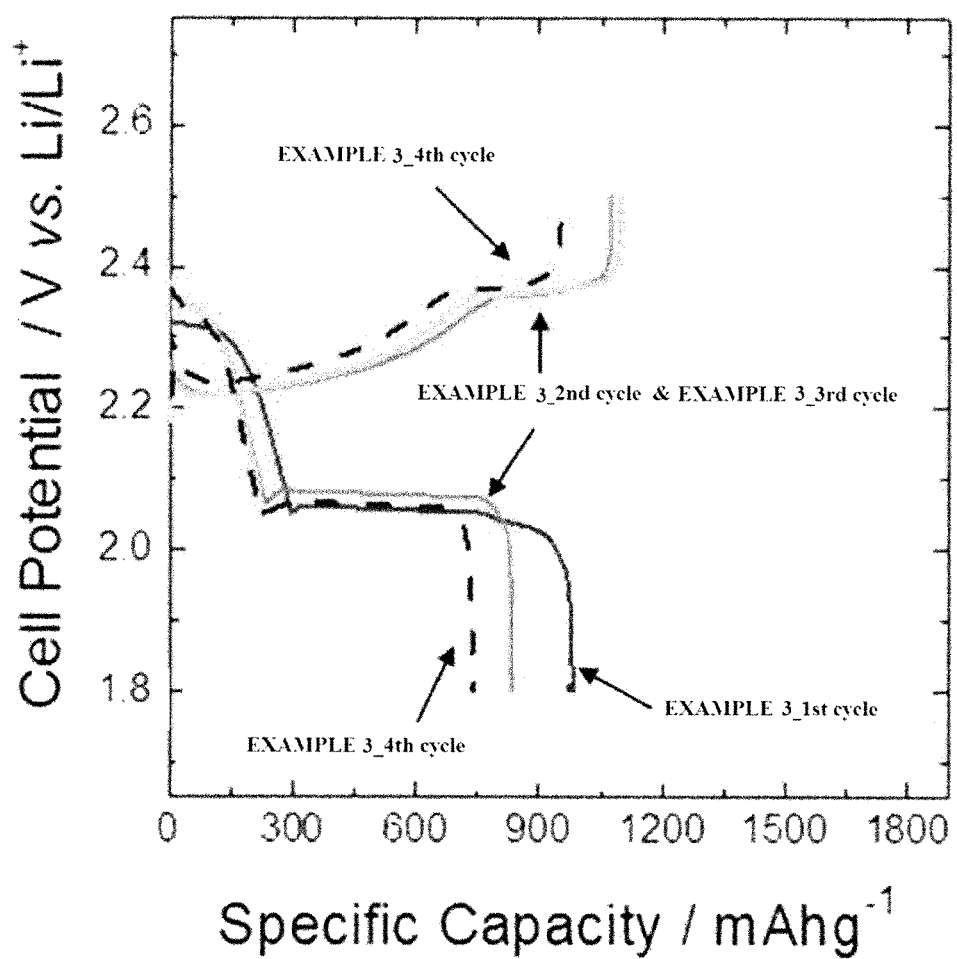

ELECTROLYTE FOR LITHIUM SECONDARY BATTERY AND LITHIUM-SECONDARY BATTERY INCLUDING THE SAME

TECHNICAL FIELD

This application claims priority to and the benefits of Korean Patent Application No. 10-2017-0121599, filed with the Korean Intellectual Property Office on Sep. 21, 2017, and Korean Patent Application No. 10-2018-0112635, filed with the Korean Intellectual Property Office on Sep. 20, 2018, the entire contents of which are incorporated herein by reference.

The present invention relates to an electrolyte for a lithium-secondary battery, and a lithium-secondary battery including the same.

BACKGROUND ART

With recent development of portable electronic devices, electric vehicles and large capacity power storage systems, demands for large capacity batteries have arisen. A lithium-sulfur battery is a secondary battery using a sulfur series material having sulfur-sulfur bonds (S—S bonds) as a positive electrode active material and using lithium metal as a negative electrode active material, and sulfur, a main material of a positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: 480 Wh/kg, Li—MnO$_2$ battery: 1,000 Wh/kg, Na—S battery: 800 Wh/kg), and therefore, has received attention as a battery having a high energy density property.

A problem that needs to be resolved first for commercializing a lithium-sulfur battery is low lifetime properties of the battery caused by lithium polysulfide. Lithium polysulfide (Li$_2$S$_x$, x=8, 6, 4, 2) is an intermediate product produced during an electrochemical reaction of a lithium-sulfur battery, and has high solubility for an organic electrolyte. The lithium polysulfide dissolved in the electrolyte is gradually diffused toward a negative electrode, and is out of an electrochemical reaction area of a positive electrode, and therefore, is not able to participate in an electrochemical reaction of the positive electrode resulting in capacity loss.

In addition, lithium polysulfide elution increases viscosity of an electrolyte decreasing ion conductivity, and the lithium polysulfide reacts with a lithium metal negative electrode through a continuous charge and discharge reaction fixing lithium sulfide (Li$_2$S) on the lithium metal surface, which causes problems of decreasing reaction activity and worsening potential problems.

In view of the above, attempts have been made to form a layer capable of protecting a Li metal negative electrode using an electrolyte additive such as LiNO$_3$, however, when using LiNO$_3$, the Li protective layer is formed while consuming LiNO$_3$ leading to a problem in that protecting the Li negative electrode is no longer possible when a limit is exceeded in a repeated charging and discharging process.

PRIOR ART DOCUMENTS

Patent Documents (Patent Document 1) Korean Patent Application Laid-Open Publication No. 2012-0122674 "Negative Electrode for Lithium Secondary Battery, Method for Preparing the Same and Lithium Secondary Battery Employing the Same"

DISCLOSURE

Technical Problem

In view of the above, the inventors of the present invention have studied a lithium-secondary battery, especially an additive added to an electrolyte of a lithium-sulfur battery, and as a result, have completed the present invention.

Accordingly, an aspect of the present invention provides an electrolyte for a lithium-secondary battery having a shuttle phenomenon reduced and favorably achieving charging without using LiNO$_3$.

Another aspect of the present invention provides a lithium-secondary battery including the electrolyte.

Technical Solution

According to an aspect of the present invention, there is provided an electrolyte for a lithium-secondary battery including a solvent, a lithium salt and an additive, wherein the additive is a diamine-based compound.

According to another aspect of the present invention, there is provided a lithium-secondary battery including a positive electrode; a lithium metal negative electrode; and the electrolyte.

Advantageous Effects

An electrolyte of the present invention is used in a lithium-secondary battery, and is effective in reducing a shuttle phenomenon and achieving favorable charging without using LiNO$_3$.

DESCRIPTION OF DRAWINGS

FIG. 1 is a graph presenting battery properties according to Example 1 of the present invention.

FIG. 2 is a graph presenting battery properties according to Example 2 of the present invention.

FIG. 3 is a graph presenting battery properties according to Comparative Example 1 of the present invention.

FIG. 4 is a graph presenting battery properties according to Comparative Example 2 of the present invention.

FIG. 5 is a graph presenting battery properties according to Example 3 of the present invention.

BEST MODE

Hereinafter, the present invention will be described in detail so that those skilled in the art may readily implement the present invention. However, the present invention may be implemented in various different forms, and is not limited to the examples described herein.

Electrolyte for Lithium-Secondary Battery

The present invention relates to an electrolyte for a lithium-secondary battery using a diamine-based compound as an additive in order to reduce a shuttle phenomenon and favorably achieve charging without using LiNO$_3$.

While conducting studies on an electrolyte composition having a shuttle phenomenon reduced and favorably achieving charging without using LiNO$_3$, the inventors of the present invention have identified that excellent battery properties sufficient to replace LiNO$_3$ are obtained when using an electrolyte including a small amount of a diamine-based compound additive in a lithium-secondary battery.

Such an effect of the diamine-based compound more clearly appears depending on the content of the diamine-based compound included in the electrolyte. Specifically, as shown in Experimental Example 1 to describe later, it is identified that excellent battery properties sufficient to replace $LiNO_3$ are obtained when using an electrolyte including a small amount of an xylylene diamine (XDA) additive.

As the diamine-based compound of the present invention described above, an aromatic diamine-based compound may be used, and more preferably, xylylene diamine (XDA) may be used.

As for the content, the diamine-based compound of the present invention described above may be included in, as one example, 0.01% by weight to 1.0% by weight, preferably in 0.05% by weight to 0.5% by weight, and more preferably in 0.1% by weight to 0.3% by weight with respect to 100% by weight of the electrolyte. When the diamine-based compound content is less than 0.01% by weight, the above-described effect of the present invention, that is, excellent battery properties sufficient to replace $LiNO_3$ may not be obtained, and when the content is greater than 1.0% by weight, Li is consumed in a manner similar to when using existing $LiNO_3$, and a thick protective layer is formed functioning as a resistive layer when driving a battery, and as a result, discharge capacity decreases and an adverse effect on lifetime properties is obtained. Therefore, the content is properly controlled within the above-mentioned range.

The electrolyte for a lithium-secondary battery of the present invention includes a solvent, and herein, the solvent is not particularly limited as long as it is used as a solvent of an electrolyte used in a lithium-secondary battery, especially, a lithium-sulfur battery. Specifically, one or more types of non-aqueous solvents selected from the group consisting of carbonate-based, ester-based, ether-based, ketone-based, alcohol-based and aprotic solvents may be used as the solvent.

As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) or the like may be used, however, the carbonate-based solvent is not limited thereto.

As the ester-based solvent, methyl acetate, ethyl acetate, n-propyl acetate, 1,1-dimethylethyl acetate, methyl propionate, ethyl propionate, γ-butyrolactone, decanolide, valerolactone, mevalonolactone, caprolactone or the like may be used, however, the ester-based solvent is not limited thereto.

As the ether-based solvent, diethyl ether, dipropyl ether, dibutyl ether, dimethoxymethane (DMM), trimethoxymethane (TMM), dimethoxyethane (DME), diethoxyethane (DEE), diglyme, triglyme, tetraglyme, tetrahydrofuran, 2-methyltetrahydrofuran, polyethylene glycol dimethyl ether or the like may be used, however, the ether-based solvent is not limited thereto.

As the ketone-based solvent, cyclohexanone or the like may be used, for example. In addition, as the alcohol-based solvent, ethyl alcohol, isopropyl alcohol or the like may be used, and as the aprotic solvent, nitriles such as acetonitrile, amides such as dimethylformamide, dioxolanes such as 1,3-dioxolane (DOL), sulfolane or the like may be used.

In addition, as the alcohol-based solvent, ethyl alcohol, isopropyl alcohol or the like may be used, and as the aprotic solvent, nitriles such as R—CN (R is a C2 to C20 hydrocarbon group having a linear, branched or cyclic structure, and may include a double bond aromatic ring or an ether bond), amides such as dimethylformamide, dioxolanes such as 1,3-dioxolane (DOL), sulfolane or the like may be used.

The non-aqueous solvent may be used either alone or as a mixture of more than one, and a mixing ratio when mixing more than one may be properly controlled depending on target battery performance.

As the non-aqueous solvent, an ether-based solvent is preferably used. The ether-based solvent is preferred since it has high compatibility with lithium metal that becomes a negative electrode of a lithium-secondary battery, especially, a lithium-sulfur battery, and is capable of increasing battery efficiency, cycle lifetime and safety. In addition, the ether-based solvent has a high donor number and thereby increases a degree of dissociation of a lithium salt by chelating a lithium cation, readily secures sulfur reactivity by increasing solubility for lithium polysulfide, and has free ion migration due to low viscosity, and therefore, may significantly enhance ion conductivity of the electrolyte.

The ether-based solvent may be linear ether, cyclic ether, or a mixed solvent thereof.

Nonlimiting examples of the linear ether may include one or more types selected from the group consisting of dimethyl ether, diethyl ether, dipropyl ether, dibutyl ether, diisobutyl ether, ethylmethyl ether, ethylpropyl ether, ethyltert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethylmethyl ether, diethylene glycol isopropylmethyl ether, diethylene glycol butylmethyl ether, diethylene glycol tert-butylethyl ether and ethylene glycol ethylmethyl ether.

Nonlimiting examples of the cyclic ether may include one or more types selected from the group consisting of dioxolane, methyl dioxolane, dimethyl dioxolane, vinyl dioxolane, methoxydioxolane, ethylmethyl dioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, furan and methylfuran.

Preferably, the ether-based solvent may be 1,3-dioxolane, 1,2-dimethoxyethane, tetrahydrofuran, 2,5-dimethylfuran, furan, 2-methylfuran, 1,4-oxane, 4-methyl-1,3-dioxolane, tetraethylene glycol dimethyl ether or a mixed solvent thereof.

More specifically, the ether-based solvent may be a mixed solvent selecting one type each from linear ether and cyclic ether, and herein, the mixing ratio may be from 5:95 to 95:5 in a volume ratio.

According to one embodiment of the present invention, the mixed solvent may be a mixed solvent of 1,3-dioxolane (DOL) and 1,2-dimethoxyethane (DME). Herein, the mixed solvent may be a solvent mixing the DOL and the DME in a volume ratio of 5:95 to 95:5, preferably 30:70 to 70:30, and more preferably 40:60 to 60:40.

Meanwhile, the electrolyte for a lithium-secondary battery of the present invention includes a lithium salt for increasing ion conductivity. The lithium salt is not particularly limited in the present invention, and those that may be commonly used in a lithium-secondary battery, especially, a lithium-sulfur battery, may be used without limit.

Specifically, the lithium salt may be one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium bis(oxalato)borate, lithium-oxalyldifluoroborate, lithium 4,5-dicyano-2-(trifluoromethyl)imidazole, lithium dicyanotriazolate, lithium thiocyanate, chloroborane lithium, lower aliphatic carboxylic acid lithium (herein, lower aliphatic may mean, for example, aliphatic having 1 to 5 carbon atoms), lithium tetraphenylborate, lithium imide and combinations thereof, and preferably, (CF$_3$SO$_2$)$_2$NLi, (C$_2$F$_5$SO$_2$)$_2$NLi, (SO$_2$F)$_2$NLi and the like may be used.

The concentration of the lithium salt may be determined considering ion conductivity and the like, and may be from 0.1 M to 4.0 M (mol/L) as one example, preferably from 0.5 M to 2.0 M, and more preferably from 0.5 M to 1.5 M. When the lithium salt concentration is less than the above-mentioned range, ion conductivity suitable for battery driving is difficult to secure, and when the concentration is greater than the above-mentioned range, viscosity of the electrolyte increases decreasing lithium ion mobility, and battery performance may decline due to an increase in the decomposition reaction of the lithium salt itself, and therefore, the concentration is properly controlled within the above-mentioned range.

In addition, the electrolyte for a lithium-secondary battery of the present invention does not include a compound having an N—O bond in the molecule, specifically, LiNO$_3$.

Including the compound having an N—O bond in the molecule such as LiNO$_3$ in an electrolyte has an advantage of forming a layer capable of protecting a Li metal negative electrode. However, since the Li protective layer is formed while consuming LiNO$_3$, there is a problem in that protecting the Li negative electrode is no longer possible when a limit is exceeded in a repeated charging and discharging process, and the inventors of the present invention adds a diamine-based compound as an additive capable of replacing the compound having an N—O bond in the molecule such as LiNO$_3$, and as a result, the compound having an N—O bond in the molecule such as LiNO$_3$ is not included.

Specific examples of the compound having an N—O bond in the molecule may be a nitrate- or nitrite-based compound, a nitro compound and the like. As one example, the compound having an N—O bond in the molecule may be selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide, and tetramethylpiperidinyloxyl.

A method for preparing the electrolyte is not particularly limited in the present invention, and common methods known in the art may be used in the preparation.

Lithium-Secondary Battery

A lithium-secondary battery according to the present invention uses the electrolyte for a lithium-secondary battery according to the present invention as an electrolyte, and thereby exhibits battery properties of a reduced shuttle phenomenon and favorably achieved charging without using LiNO$_3$. The lithium-secondary battery, especially, a lithium-sulfur battery, includes a positive electrode including a sulfur compound, a negative electrode including lithium metal or a lithium alloy, and in addition thereto, may include a separator provided between the positive electrode and the negative electrode.

The constitution of the positive electrode, the negative electrode and the separator of the lithium-secondary battery is not particularly limited in the present invention, and may follow constitutions known in the art.

Positive Electrode

The positive electrode according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material includes a sulfur compound, and the sulfur compound may include elemental sulfur (S8), sulfur series compounds or mixtures thereof. The sulfur series compound may specifically be Li$_2$S$_n$ (n≥1), an organosulfur compound, a carbon-sulfur polymer ((C$_2$S$_x$)$_n$: x=2.5 to 50, n≥2) or the like. These may be used as a composite with a conductor since a sulfur material alone does not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

Negative Electrode

The negative electrode according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions (Lit), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions (Lit) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

In addition, a lithium metal negative electrode may be preferably used as the negative electrode according to the present invention.

Separator

A common separator may be provided between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the electrolyte are preferred.

In addition, the separator enables lithium ion transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium-secondary battery may each be prepared using common components and preparation methods, and although not particularly limited thereto, appearances of the lithium-secondary battery may include a cylinder-type, a square-type, a pouch-type, a coin-type using a can, and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

Example: Preparation of Electrolyte

Example 1

An electrolyte was prepared by adding a 1 M concentration of $(SO_2F_3)_2NLi$ to a solvent mixing dioxolane (DOL) and dimethoxyethane (DME) in 1:1 (v/v), and adding 0.1% by weight of xylylene diamine (XDA) based on the total weight of the electrolyte thereto.

Example 2

An electrolyte was prepared in the same manner as in Example 1 except that 0.2% by weight of xylylene diamine (XDA) was added.

Example 3

An electrolyte was prepared in the same manner as in Example 1 except that 0.1% by weight of $LiNO_3$ was added together with 0.1% by weight of xylylene diamine (XDA).

Comparative Example 1

An electrolyte was prepared in the same manner as in Example 1 except that XDA was not added.

Comparative Example 2

An electrolyte was prepared in the same manner as in Example 1 except that 2,4,6-trimethyl aniline was added instead of XDA.

Experimental Example 1: Evaluation on Battery Performance (Preparation of Lithium Sulfur Electrode)

90% by weight of sulfur, 5% by weight of carbon black, and 5% by weight of polyethylene oxide were mixed with acetonitrile to prepare positive electrode active material slurry. The positive electrode active material slurry was coated on an aluminum current collector, and the result was dried to prepare a positive electrode having a size of 30 $mm^2 \times 50\ mm^2$ and a loading amount of 5 $mAh/cm^2$.

In addition, lithium metal having a thickness of 50 μm was employed as a negative electrode. In order to remove a native layer formed on the lithium metal, polishing was progressed in a glove box using a brush.

The prepared positive electrode and the negative electrode were placed to face each other, and a polyethylene separator having a thickness of 20 μm was provided therebetween, and the result was filled with each of the electrolytes of Examples 1 to 3 and Comparative Examples 1 and 2 to manufacture a coin cell.

(Evaluation on Battery Performance)

In order to evaluate the effect of XDA content included in the electrolyte and lithium nitrate inclusion on battery performance, specific capacity and cell potential were measured and compared for each of the lithium-sulfur batteries of Examples 1 to 3 and Comparative Examples 1 and 2 while progressing 3 cycles under the following condition, and the results of Example 1 is shown in FIG. 1, the results of Example 2 in FIG. 2, the results of Comparative Example 1 in FIG. 3, the results of Comparative Example 2 in FIG. 4, and the results of Example 3 in FIG. 5.

Charge and discharge condition: discharge and charge were repeated 2.5 times with current density of 0.1 C. The discharge was progressed to a lower limit voltage of 1.8 V (vs. Li/Li$^+$), and the charge was progressed to an upper limit voltage of 2.5 V (vs. Li/Li$^+$).

When examining the results of FIG. 1 to FIG. 5, charge delay, a phenomenon of charge capacity increasing without completing charging when reaching 2.5 V during charge, occurred in Comparative Example 1, and this is known to be caused by a shuttle phenomenon of lithium polysulfide.

On the other hand, it was seen that the batteries using the electrolytes of Example 1 and Example 2 including XDA had reduced charge delay that occurred in Comparative Example 1, and in particular, the effect significantly increased in Example 2 with a high XDA content.

In addition, it was seen that the battery using the electrolyte of Comparative Example 2 including a general amine compound had charge delay as in Comparative Example 1, and normal charging was not progressed.

It was also seen that, in the battery using the electrolyte of Example 3 including LiNO$_3$ as well, the LiNO$_3$ and the XDA acted at once and, even when a small amount of the additive was used, stable driving was obtained compared to when only XDA was used.

Through the above-described results, effects of the electrolyte using XDA, a diamine compound, as an additive instead of iLiNO$_3$ were identified, and it was seen that a shuttle phenomenon of lithium polysulfide was reduced, and charging was normally achieved when the additive content increased.

The invention claimed is:

1. An electrolyte for a lithium-secondary battery comprising:
   a solvent;
   a lithium salt; and
   an additive,
   wherein the additive is a diamine-based compound that is an xylylene diamine (XDA).

2. The electrolyte for a lithium-secondary battery of claim 1, wherein the solvent comprises one or more non-aqueous solvent selected from the group consisting of carbonate-based solvent, ester-based solvent, ether-based solvent, ketone-based solvent, alcohol-based solvent and aprotic solvent.

3. The electrolyte for a lithium-secondary battery of claim 1, wherein the lithium salt comprises one or more selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium bis(oxalato)borate, lithium-oxalyldifluoroborate, lithium 4,5-dicyano-2-(trifluoromethyl)imidazole, lithium dicyanotriazolate, lithium thiocyanate, chloroborane lithium, lower aliphatic carboxylic acid lithium, lithium tetraphenylborate and lithium imide.

4. The electrolyte for a lithium-secondary battery of claim 1, wherein the lithium salt is present in a concentration of 0.1 M to 4 M.

5. The electrolyte for a lithium-secondary battery of claim 1, wherein the additive is present in an amount of 0.01% by weight to 1.0% by weight based on 100% by weight of the electrolyte.

6. The electrolyte for a lithium-secondary battery of claim 1, wherein the additive is present in an amount of 0.05% by weight to 0.5% by weight based on 100% by weight of the electrolyte.

7. The electrolyte for a lithium-secondary battery of claim 1, wherein the additive is present in an amount of 0.1% by weight to 0.3% by weight based on 100% by weight of the electrolyte.

8. The electrolyte for a lithium-secondary battery of claim 1, which does not include a compound having an N—O bond.

9. A lithium-secondary battery comprising:
   a positive electrode;
   a negative electrode; and
   the electrolyte of claim 1.

10. The lithium-secondary battery of claim 9, wherein the positive electrode comprises a sulfur compound, and the negative electrode comprises lithium metal or a lithium alloy.

11. An electrolyte for a lithium-secondary battery consisting of:
    a solvent;
    a lithium salt; and
    an additive,
    wherein the additive is xylylene diamine (XDA).

12. The electrolyte for a lithium-secondary battery of claim 11, wherein the solvent comprises one or more non-aqueous solvent selected from the group consisting of carbonate-based solvent, ester-based solvent, ether-based solvent, ketone-based solvent, alcohol-based solvent and aprotic solvent.

13. The electrolyte for a lithium-secondary battery of claim 11, wherein the lithium salt comprises one or more selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium bis(oxalato)borate, lithium-oxalyldifluoroborate, lithium 4,5-dicyano-2-(trifluoromethyl)imidazole, lithium dicyanotriazolate, lithium thiocyanate, chloroborane lithium, lower aliphatic carboxylic acid lithium, lithium tetraphenylborate and lithium imide.

14. The electrolyte for a lithium-secondary battery of claim 11, wherein the lithium salt is present in a concentration of 0.1 M to 4 M.

15. The electrolyte for a lithium-secondary battery of claim 11, wherein the additive is present in an amount of 0.01% by weight to 1.0% by weight based on 100% by weight of the electrolyte.

16. The electrolyte for a lithium-secondary battery of claim 11, wherein the additive is present in an amount of 0.05% by weight to 0.5% by weight based on 100% by weight of the electrolyte.

17. The electrolyte for a lithium-secondary battery of claim 11, wherein the additive is present in an amount of 0.1% by weight to 0.3% by weight based on 100% by weight of the electrolyte.

18. The electrolyte for a lithium-secondary battery of claim 11, which does not include a compound having an N—O bond.

19. A lithium-secondary battery comprising:
a positive electrode;
a negative electrode; and
the electrolyte of claim 11.

20. The lithium-secondary battery of claim 19, wherein the positive electrode comprises a sulfur compound, and the negative electrode comprises lithium metal or a lithium alloy.

* * * * *